United States Patent
Sun et al.

(10) Patent No.: US 11,521,427 B1
(45) Date of Patent: Dec. 6, 2022

(54) EAR DETECTION METHOD WITH DEEP LEARNING PAIRWISE MODEL BASED ON CONTEXTUAL INFORMATION

(71) Applicant: SUQIAN UNIVERSITY, Suqian (CN)

(72) Inventors: Lei Sun, Suqian (CN); Hongxi Wang, Suqian (CN); Guanwei Wang, Suqian (CN)

(73) Assignee: SUQIAN UNIVERSITY, Suqian (CN)

( * ) Notice: Subject to any disclaimer, the term of this patent is extended or adjusted under 35 U.S.C. 154(b) by 0 days.

(21) Appl. No.: 17/889,723

(22) Filed: Aug. 17, 2022

(30) Foreign Application Priority Data

Sep. 30, 2021 (CN) .......................... 202111165355.2

(51) Int. Cl.
| | |
|---|---|
| *G06V 40/16* | (2022.01) |
| *G06V 10/82* | (2022.01) |
| *G06N 3/08* | (2006.01) |
| *G06V 10/762* | (2022.01) |
| *G06V 10/44* | (2022.01) |

(Continued)

(52) U.S. Cl.
CPC ........... *G06V 40/172* (2022.01); *G06N 3/084* (2013.01); *G06V 10/26* (2022.01); *G06V 10/44* (2022.01);
(Continued)

(58) Field of Classification Search
CPC ...... G06V 10/764; G06V 10/82; G06V 10/42; G06V 10/462; G06V 10/467; G06V 10/50;
(Continued)

(56) References Cited

U.S. PATENT DOCUMENTS

| | | | | |
|---|---|---|---|---|
| 2017/0249535 | A1* | 8/2017 | Swaminathan | G06K 9/627 |
| 2019/0286891 | A1* | 9/2019 | Sarkar | G06N 3/0481 |
| 2020/0328897 | A1* | 10/2020 | Kim | G06V 40/171 |

FOREIGN PATENT DOCUMENTS

| | | | |
|---|---|---|---|
| CN | 100495427 C | * | 6/2009 |
| CN | 102831390 A | * | 12/2012 |

(Continued)

OTHER PUBLICATIONS

Maxime Oquab, Leon Bottou, Ivan Laptev, Josef Sivic, "Learning and Transferring Mid-Level Image Representations using Convolutional Neural Networks", CVPR, Jun. 2014.
(Continued)

*Primary Examiner* — Ross Varndell
(74) *Attorney, Agent, or Firm* — Hemisphere Law, PLLC; Zhigang Ma

(57) ABSTRACT

An ear detection method with deep learning pairwise model based on contextual information belongs to the field of biometric recognition technologies, and addresses a problem that an ear location cannot be found in a large scene, especially in a background image containing a whole body. The method includes: performing preprocessing and object labeling on images; modifying an Oquab network to be a local model for four classes through transfer learning and training the local model; training two pairwise models of head and ear as well as body and head based on the local model; and performing joint detection for an ear through the local model, the two pairwise models and body features. The method uses a hierarchical relationship from large to small to establish contextual information, which can reduce the interference of other features and detect the location of the ear more accurately.

2 Claims, 2 Drawing Sheets

(51) Int. Cl.
*G06V 10/26* (2022.01)
*G06V 10/774* (2022.01)

(52) U.S. Cl.
CPC .......... *G06V 10/762* (2022.01); *G06V 10/774* (2022.01); *G06V 10/82* (2022.01); *G06V 40/171* (2022.01)

(58) Field of Classification Search
CPC .. G06V 10/752; G06V 10/761; G06V 10/955; G06V 20/80; G06V 40/10; G06V 40/171; G06V 40/67
See application file for complete search history.

(56) References Cited

FOREIGN PATENT DOCUMENTS

| CN | 106650578 A | 5/2017 |
|---|---|---|
| CN | 109086657 A | 12/2018 |
| CN | 106156739 B | 6/2019 |
| CN | 109934834 A | 6/2019 |

OTHER PUBLICATIONS

CNIPA, Notification to Make Corrections for CN202111165355.2, with replacement specification, dated Dec. 1, 2021.
Xi'an Technological University (Applicant), Reply to Notification to Make Corrections for CN202111165355.2, dated Dec. 2, 2021.
CNIPA, Notification of a First Office Action for CN202111165355.2, dated Feb. 28, 2022.
Xi'an Technological University (Applicant), Reply to Notification of a First Office Action for CN202111165355.2, w/ replacement claims (allowed), dated Mar. 9, 2022.
CNIPA, Notification to grant patent right for invention in CN202111165355.2, dated Mar. 29, 2022.

* cited by examiner

EAR DETECTION METHOD WITH DEEP LEARNING PAIRWISE MODEL BASED ON CONTEXTUAL INFORMATION

TECHNICAL FIELD

The invention relates to the technical field of biometric recognition methods, in particular to an ear detection method with deep learning pairwise model based on contextual information.

BACKGROUND

The research of biometric recognition is still in the stage of development, and any kind of biological feature is not perfect and has its inherent limitation. As a new biometric recognition technology, ear recognition has its own unique advantages, and thus has attracted more and more attention because of its naturalness and high user acceptability. The ear recognition is an extension of the field of biometric recognition, which can make up for shortcomings of face recognition and iris recognition technologies. Therefore, ear automatic detection and recognition is a relatively new research direction in the field of pattern recognition. The ear detection is an important prerequisite for recognition. The ear detection takes collective human ears as a kind of pattern and focuses on commonalities of the human ears. The ear recognition takes individual human ear as a kind of pattern and focuses on the study of personality of the human ear. For a complete automatic ear recognition system, both the ear detection and the ear recognition are indispensable and important components. The ear detection and the ear recognition are both concerned with image features of human ear, but resulting from their different perspectives, they form different solutions. The ear detection is to segment a detected object from a side facial image and then determine a position and a size of the detected object. The ear recognition is to recognize classes of different ears under the condition that the ears have been detected.

Chinese patent application publication No. CN109934834A discloses image contour extraction method and system, and a method of extracting ear contour disclosed in this patent application is mainly based on a detected ear rectangular box. Chinese patent publication No. CN106156739B discloses an identification (ID) photo ear detection and extraction method based on facial outline analysis, and input images disclosed in this patent are mainly ID photos, that is, a head area is taken as the whole input image, and thus an ear background area is single and definite. Chinese patent application publication No. CN109086657A discloses ear detection method, system and model based on machine learning, and this patent application discloses employing an ultra-high resolution side facial photo, that is, an input original image is a local image containing a side facial portion where the ear is located, and thus an ear background area is single and clean. Chinese patent application publication No. CN106650578A discloses an auricle detection method based on active shape model (ASM) algorithm and Lazy Snapping algorithm, and this patent application realizes an output of an ear curve by detecting feature points on an auricle, and an input image of this method is a detected ear rectangular box. Some scholars have proposed a simple and efficient method of detecting a human ear from a side facial image, which uses an average gray value change curve of graphic index to describe an ear model template. In an on-line detection stage, possible areas of an ear are found by using step edge detection and steps such as thresholding and image magnification, and then the area with the smallest shape index and template difference is taken as a target area of the ear. In addition, some scholars have proposed a dynamic ear detection method based on skin color statistical model, and specifically, moving objects are extracted from a color image sequence according to an adaptive background model, and then a skin color region is segmented by using color information, and afterwards an ear template is used to search in the region for matching.

All of the above are traditional ear detection methods based on features, but with the development of technology, deep learning based on convolutional neural network (CNN) is becoming more and more favored by many scholars. At present, detection methods based on deep learning can be roughly classified into two categories. One category is a two-stage deep learning target detection algorithm based on candidate box, and represented by region-based CNN (RCNN) series; and the other category is a single-stage deep learning target detection algorithm based on regression method, and represented by you only look once (YOLO) series. However, regardless of which category of algorithms, when being applied directly to ear target detection, there is a problem that it cannot find out a location of the ear in a large scene, especially in a background image containing the whole human body.

SUMMARY

The invention provides an ear detection method with deep learning pairwise model based on contextual information, in order to overcome the problem that the prior art cannot find out the location of the ear in the large scene, especially in the background image containing the whole body.

In order to achieve the purpose of the invention, the invention provides technical solutions as follows. Specifically, an ear detection method with deep learning pairwise model based on contextual information, may include the following steps:

step 1, image preprocessing and object labeling, including: obtaining original images, performing data augmentation processing on the original images to obtain an image training set, and labeling bodies, heads and ears of images in the image training set with classes through rectangular boxes;

step 2, modifying an Oquab network to be a local model for four classes through transfer learning and training the local model, including:

i) removing an output layer and a last feature layer of the Oquab network, adding a fully connected layer including rectified linear unit (ReLU) and dropout functions for feature extraction, and adding an output layer including the four classes of body, head, ear and background;

ii) generating suggested candidate boxes for each the image in the image training set through a signed sliding window (SSW) method, and adding truth values of the body, the head and the ear into the suggested candidate boxes for each the image to form training samples;

iii) reading images of the training samples, calculating an image average value according to the training samples, subtracting the image average value from the training samples and then training; wherein the image average value is represented by $[M_r, M_g, M_b]$; and iv) employing an already set network structure, and training network parameters of the local model through a random gradient descent method with momentum;

step 3, training two pairwise models of head and ear as well as body and head based on the local model individually, including: selecting a first convolutional layer through an eighth convolutional layer of the local model as a front part of each the pairwise model and connecting two fully connected layers in parallel as a rear part of each the pairwise model, 1) Pairwise Model Building:

for one of the pairwise models, the front part thereof is the same as that of the trained local model, and the rear part thereof is the two fully connected layers connected in parallel; one of the two fully connected layers is a unitary potential field network model layer, and the other of the two fully connected layers is a pairwise model potential field network layer; and a joint score function is expressed as formula (1):

$$S(y;\omega) = \alpha \Sigma_{i \in v_1} y_i \theta_i^U(\omega) + \beta \Sigma_{j \in v_2} y_j \theta_j^U(\omega) + \gamma \Sigma_{(i,j) \in \varepsilon} y_i y_j \theta_{i,j,k_{i,j}}^P(\omega) \quad (1)$$

where $S(y; \omega)$ represents a joint score; $\alpha$, $\beta$ and $\gamma$ are penalty weights, which represent influences of different potential fields on the joint score; $\alpha$ represents the influence of a head potential field on the joint score, $\beta$ represents the influence of an ear potential field on the joint score, $\gamma$ represents the influence of the pairwise model on the joint score, and $\alpha+\beta+\gamma=1$; $y_i$ and $y_j$ are binary variables, $v_1$ and $v_2$ are candidate variables of head and ear respectively; and $\varepsilon$ is a candidate set of pairwise head and ear formed by (i, j), namely, an edge set;

corresponding to a feature vector $f_i$ of single head and a feature vector f of single ear, corresponding unitary potential field values are obtained through formula (2):

$$\theta_i^U = \varphi^U(f_i, \omega^U), \theta_j^U = \varphi_U(f_j, \omega^U) \quad (2)$$

a joint potential field value corresponding to the head and the ear in pair is obtained through formula 3:

$$\theta_{i,j,k_{i,j}}^P = \varphi_{k_{i,j}}^P(f_i, f_j, \omega^P) \quad (3)$$

where $\theta_i^U$ represents the unitary potential field value of the head, By represents the unitary potential field value of the ear, $\varphi^U$ maps the feature vectors $f_i$ and $f_j$ to $\theta_i^U$ and $\theta_j^U$, or $\theta_{i,j,k_{i,j}}^P$ represents the joint potential field value of the head and the ear in pair, $\varphi^P$ maps candidate features of the head and the ear in pair to $\theta_{i,j,k_{i,j}}^P$, a k-th component corresponds to a k-th cluster center index, and $\omega^U$ and $\omega^P$ are trainable parameters;

for each pairwise candidate boxes P of head and ear, an individual score $s_p(\omega)$ defined by a maximum marginal difference of joint score is obtained through formula (4):

$$s_p(\omega) = \max_{y;y_p=1} S(y;\omega) - \max_{y;y_p=0} S(y;\omega) \quad (4)$$

where $v_1=v_2$ and $v_1+v_2=v$; when a value of v is small, an enumeration method is used to solve an optimal solution of the formula (4); when the value of v is large, a quadratic pseudo-Boolean function is first used to solve a suboptimal solution of the formula (4) and some of data are labeled, and then remaining unlabeled data are solved through the enumeration method and labeled; and after data all are labeled, a function loss of the pairwise model is calculated through a loss function expressed as formula (5):

$$L(\omega, \tilde{y}, X) = \Sigma_{i:\tilde{y}_i=1} v(s_i(\omega, x)) + \Sigma_{i:\tilde{y}_i=0} v(-s_i(\omega, x)) \quad (5)$$

where $v(t) = \log(1+\exp(-t))$;

2) Pairwise Model Training:

① according to scores of images obtained through the local model, selecting head candidate boxes and ear candidate boxes by ranking the scores from high to low and using a non-maximum suppression method, forming head and ear pairs based on the selected head candidate boxes and ear candidate boxes, and sorting paired head and ear data to form candidate pairs each with a layout of head-left and ear-right;

② performing cluster analysis on the candidate pairs through a k-means method, and assigning a class number k to each of samples in the candidate pairs, wherein the class number k refers to a cluster center to which each the sample belongs;

③ removing a softmax layer of the local model, taking the feature vector $f_1$ of head and the feature vector f of ear obtained by the eighth convolution layer as initial features, sending the initial features simultaneously to the two fully connected layers (conv10, conv11) to thereby obtain the unitary potential field values from the unitary potential field network model layer and the joint potential field value from the pairwise model potential field network layer; determining class labels of candidate boxes by using a maximum flow minimum cut method for the formula (4), using the enumeration method to determine a class label of each remaining candidate box when there is a candidate box has not been labeled, calculating a final function loss value through the formula (5), obtaining trained values of the trainable parameters $\omega^U$, $\omega^P$ under a lowest loss value by calculating a gradient differential of the pairwise model and updating parameters through back propagation, and thereby obtaining the pairwise model of head and ear with the layout of head-left and ear-right; and repeating the above 1) and 2) in the step 3, and thereby obtaining the pairwise model of body and head with a layout of body-left and head-right;

step 4, performing joint detection for an ear through the local model, the two pairwise models and body features;

I) obtaining candidate boxes of a detected image through the SSW segmentation method, and sending the candidate boxes of the detected image to the local model for detection to obtain local scores of corresponding classes of the candidate boxes of the detected image, ranking the local scores from high to low, and selecting candidate boxes from the candidate boxes of the detected image for the corresponding classes through a non-maximum suppression method; inputting local features corresponding to the selected candidate boxes to the two fully connected layers to obtain unitary potential field values and pairwise potential field values of the detected image according to the two pairwise models; calculating based on the unitary potential field values and the pairwise potential field values, to obtain a head candidate set and an ear candidate set as per scores ranking from high to low;

II) detecting a head location based on through the pairwise model of body and head and the local model, including: calculating a head height $H_h$ according to a width of a body candidate box; moving upwards, downwards, leftwards and rightwards each with a distance of one the head height $H_h$ to form a reference region $H_s = 4H_h^2$ by taking a top center of the target candidate box as a reference, obtaining candidate boxes in the head candidate set intersecting with the reference region $H_s$ as a head candidate box set $H_c$, setting a head probability threshold $a_h$, and obtaining candidate boxes in the head candidate box set $H_c$ meeting a condition of $H_c > a_h$ as head candidate targets $H_{ca}$;

III) selecting $C_h$ number of head candidate targets as per scores of the pairwise model of body and head ranking from high to low, performing joint judgement on the head candidate targets $H_{ca}$ and the $C_h$ number of head candidate targets to obtain a first intersection of the head candidate targets $H_{ca}$ and the $C_h$ number of head candidate targets; taking the first intersection as a head candidate target set $H_{sec}$ when the first intersection is not empty, or selecting the head candidate targets with larger scores from the $C_h$ number of head candidate targets as the head candidate target set $H_{sec}$ when the first intersection is empty;

IV) calculating ear candidate targets corresponding to head candidate boxes in the head candidate target set $H_{sec}$ based on the head candidate target set $H_{sec}$, including: setting an ear candidate region in a range of $$\left[-\frac{2}{5}H_h, \frac{2}{5}H_h\right]$$

obtained according to a range of $$\left[-\frac{2}{5}, \frac{2}{5}\right]$$

of head width using left and right boundary lines as reference and being replaced the head width with the head height $H_h$, calculating corresponding ear regions $$\left[-\frac{2}{5}H_h, \frac{2}{5}H_h\right]$$

according to head regions in the head candidate target set $H_{sec}$, obtaining an intersection of a segmentation target set and the ear regions $$\left[-\frac{2}{5}H_h, \frac{2}{5}H_h\right]$$

as an ear candidate set $S_e$, obtaining an ear candidate target set $S_{ec}$ by ranking candidate boxes in the ear candidate set $S_e$ as per scores of the local model for ear from high to low; obtaining a candidate box score set by applying the pairwise model of head and ear, obtaining a second intersection of $C_e$ number of ear candidate boxes contained in the candidate box score set and ear-containing candidate boxes in the head candidate target set $H_{sec}$; taking the second intersection as an ear detection target set $C_{ec}$ when the second intersection is not empty, or selecting ear candidate boxes with larger scores from the $C_e$ number of ear candidate boxes as the ear detection target set $C_{ec}$ when the second intersection is empty;

V) performing joint judgement on the ear detection target set $C_{ec}$ and the ear candidate target set $S_{ec}$, obtaining a third intersection of the ear detection target set $C_{ec}$ and the ear candidate target set $S_{ec}$, taking an ear candidate box with a largest score of the pairwise model of head and ear in the third intersection as a resultant ear object when the third intersection is not empty, or selecting the ear candidate box with a largest score from the ear detection target set $C_{ec}$ as the resultant ear object when the third intersection set is empty; and VI) performing curve evolution of ear outer contour, including: obtaining a curve contour of the ear by taking the ear candidate box corresponding to the resultant ear object as an initial boundary and performing the curve evolution on an image in a region twice as large as that the ear candidate box corresponding to the resultant ear object through a Chan-Vese (C-V) method; extracting coordinates of uppermost, lowermost, leftmost and rightmost pixels in the curve contour of the ear from an ear contour pixel coordinate set $P_c=\{P_{r,c}|r,c \in N\}$; and redrawing a rectangular box based on the coordinates of the uppermost, lowermost, leftmost and rightmost pixels as a resultant ear object region.

when using the formula (5) to calculate the final function loss value in 2)-③ of the step 3, weights of truth labels and a background weight are set based on a quantity of the truth labels and a quantity of background labels inversely proportional to the quantity of the truth labels and normalized.

Compared with the prior art, embodiments of the invention may have the following advantages and beneficial effects.

1. Because the traditional ear detection method can only realize ear detection of an input image with the head region as background, it cannot find the location of the ear in a large scene. The embodiment of the invention makes use of contextual information, so that a location of the ear can be found in the background image containing the whole body.

Moreover, the embodiment of the invention considers objective contextual information of the ear, that is, whenever, the ear must belong to a certain region of the head, and the head must belong to a certain region of the body. This hierarchical relationship from large to small can be used to establish contextual information, the interference of other features can be reduced and the location of the ear can be detected more accurately.

2. Compared with the prior art, the embodiment of the invention is characterized in that is that the following key steps are taken: (1) the embodiment of the invention defines a joint score of different classes of components in pairs, and gives different weight parameters to the different classes of components; and meanwhile, spatial layout information is integrated into the joint score in the form of clustering classes, and thereby the loss function is calculated to train the pairwise models; (2) during the ear detection, a decision-making process combines the local model, the pairwise model of body and head (pairwise model 1), the pairwise model of head and ear (pairwise model 2) and body structure to comprehensively determine the final object location, the C-V method is used to extract an ear contour based on the ear candidate box and the ear region then is repositioned; the priori knowledge of spatial layout among various classes of components is used, and the clustering method is used to integrate the spatial information into the training process. Thus, when the two pairwise models are used for detection, it can use feature information of different classes of components, and enhance the anti-interference ability of object detection through spatial layout information from large to small among the components, which effectively improves the accuracy of object detection.

DETAILED DESCRIPTION OF EMBODIMENTS

The invention will be described in detail below in combination with the accompanying drawings and embodiments.

Figure 1:
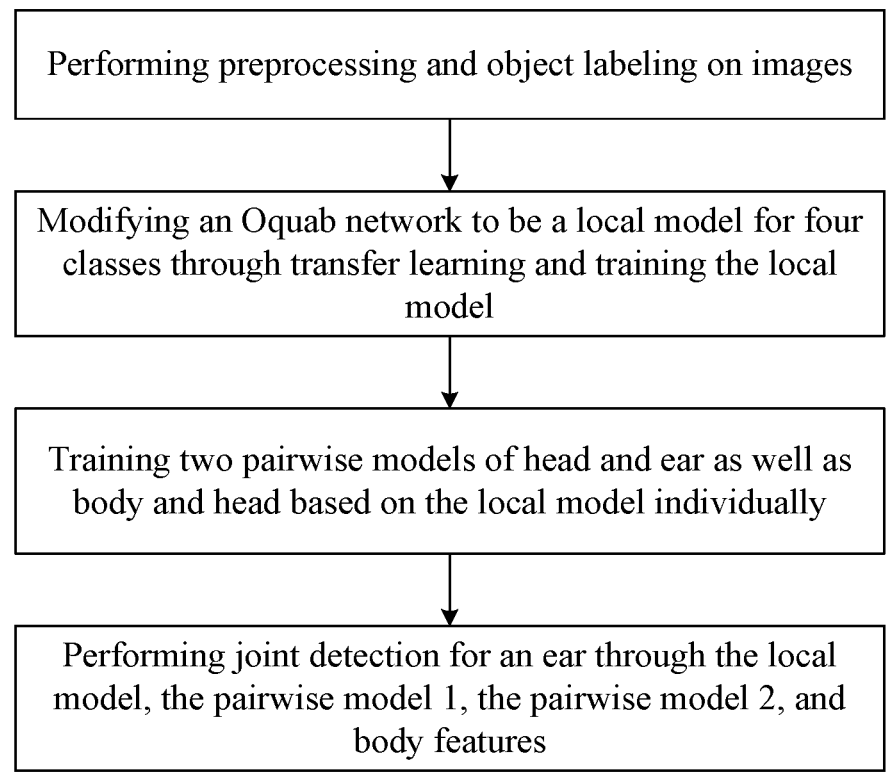
FIG. 1 is a schematic flowchart of a method according to an embodiment of the invention.

Please refer to FIG. 1, an embodiment of the invention provides an ear detection method with deep learning pairwise model based on contextual information, including steps as follows.

Step 1: image preprocessing and object labeling

In particular, 700 numbers of original images are obtained through network collection and personal shooting, and then the original images are performed data augmentation processing, including operations such as image flipping, image resizing, image translation, image rotation, and noise addition; and an image training set including a total of more than 8000 numbers of images is then obtained. Afterwards, bodies, heads and ears of images in the image training set are labeled with classes.

Step 2: modifying an Oquab convolutional neural network (also referred to as Oquab network) to be a local model for four classes through transfer learning, and training the local model.

The transfer learning can transfer feature parameters of a source network learned from a large amount of data to a new network with a small number of training samples. In Maxime Oquab, Leon Bottou, Ivan Laptev, Josef Sivic, "Learning and Transferring Mid-Level Image Representations using Convolutional Neural Networks", CVPR, June 2014, the Oquab network is proposed. The Oquab network is copied and the output layer and the last feature layer of the Oquab network are removed, and then a fully connected layer including rectified linear unit (ReLU) and dropout functions is added for feature extraction, and an output layer of four classes (i.e., body, head, ear and background) is added. For each of the images in the image training set, a signed sliding window (SSW) method is used to generate recommended/suggested candidate boxes, and truth values of the body, the head and the ear are added to the recommended candidate boxes for each of the images, to thereby form initial training samples. Afterwards, images of the training samples are read, and an image average value is calculated according to the training samples, and then each of the training samples is subtracted with the average value and then used for training. The calculated image average value is [$M_r$, $M_g$, $M_b$], $M_r$ represents a red average value of the training samples, $M_g$ represents a green average value of the training samples, and $M_b$ represents a blue average value of the training samples. The already set network structure then is employed, and a random gradient descent method with momentum is used to train network parameters of the local model.

Figure 2:
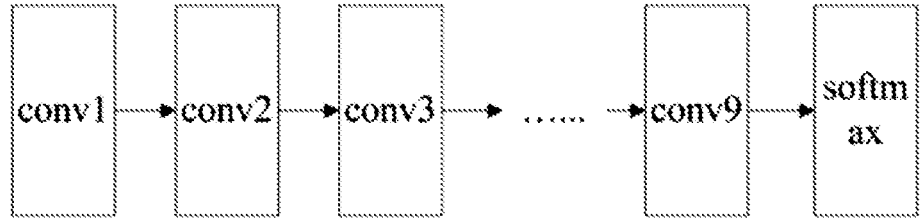
FIG. 2 is a schematic view of a network flow of a local model according to an embodiment of the invention.

The images inputted into the local model network are 224*224*3, and a whole network flow is shown in FIG. 2. See Table 1 for the parameters.

TABLE 1 network parameters

| 224*224*3 | Parameters | Output |
|---|---|---|
| Conv1 | 11*11*3*96, Stride = 4, Pad = 2*1*2*1, ReLU = 1, Mpool = 2 | 55*55*96*128 |
| Conv2 | 5*5*96*256, Stride = 1, Pad = 2, ReLU = 1, Mpool = 2 | 27*27*256*128 |
| Conv3 | 3*3*256*384, Stride = 1, Pad = 1, ReLU = 1 | 13*13*384*128 |
| Conv4 | 3*3*384*384, Stride = 1, Pad = 1, ReLU = 1 | 13*13*384*128 |
| Conv5 | 3*3*384*256, Stride = 1, Pad = 1, ReLU = 1, Mpool = 2 | 6*6*256*128 |
| Conv6 | 6*6*256*6144, Stride = 1, Pad = 0, ReLU = 1, dropout = 1 | 1*1*6144*128 |

TABLE 1-continued network parameters

| 224*224*3 | Parameters | Output |
|---|---|---|
| Conv7 | 1*1*6144*6144, Stride = 1, Pad = 0, ReLU = 1, dropout = 1 | 1*1*6144*128 |
| Conv8 | 1*1*6144*2048, Stride = 1, Pad = 0, ReLU = 1, dropout = 1 | 1*1*2048*128 |
| Conv9 | 1*1*2048*4, Stride = 1, Pad = 0, ReLU = 1, dropout = 1 | 1*1*2*128 |
| Softmax loss | Using cross entropy to calculate loss function | |
| Conv10 | 1*1*2048*1, Stride = 1, Pad = 0, ReLU = 1, dropout = 1 | 1*1*1*128 |
| Conv11 | 1*1*4096*16, Stride = 1, Pad = 0, ReLU = 1, dropout = 1 | 1*1*16*1024 |
| loss | according to a unitary potential field output by conv10 and a pairwise potential field output by conv11, a target loss value of a mixed function is obtained by using formula (5). | |

Step 3: two pairwise models of head and ear as well as body and head (i.e., a pairwise model 2 and pairwise model 1) are trained individually according to the local model.

Figure 3:
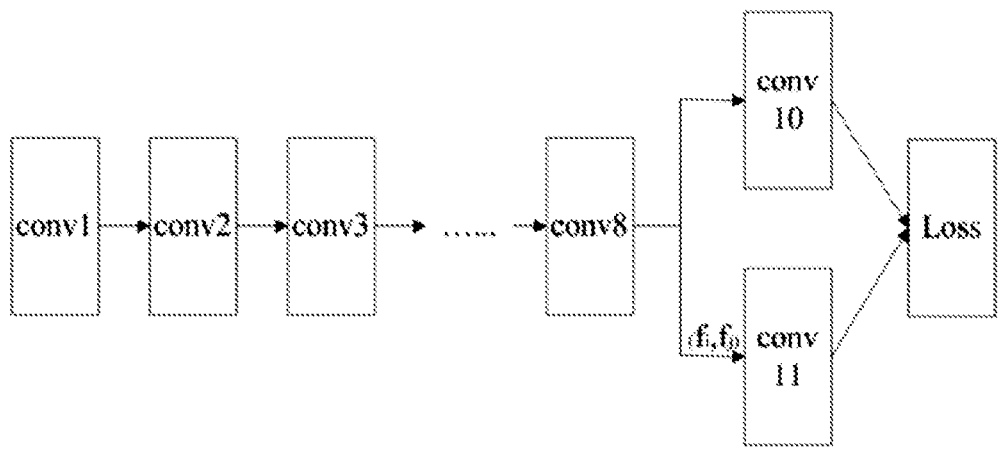
FIG. 3 is a schematic view of a network flow of a pairwise model according to an embodiment of the invention.

Specifically, first to eighth convolutional layers (i.e., conv1 to conv8) of the local model network are selected as a front part, and then a tenth convolutional layer (conv10) and an eleventh convolutional layer (conv11) are connected in parallel to the front part. A loss value can be obtained by inputting the unitary potential field values output by the conv10 and a pairwise potential field value output by the conv11 into the formula (5). A network flow of each the pairwise model is shown in FIG. 3, and the parameters are shown in Table 1.

1. Building of Pairwise Model

For one of the pairwise models, the front part of the pairwise model is the same as that of the trained local model, and two fully connected layers (i.e., conv10 and conv11) connected in parallel are taken as a rear part of the pairwise model. One of the two fully connected layers is a unitary potential field network model layer, the other one of the two fully connected layers is a pairwise model potential field network layer. A joint score function is defined by formula (1) as follows:

$$S(y;\omega) = \alpha \Sigma_{i \in v_1} y_i \theta_i^U(\omega) + \beta \Sigma_{j \in v_2} y_j \theta_j^U(\omega) + \gamma \Sigma_{(i,j) \in \varepsilon} y_i y_j \theta_{i,j,k_{i,j}}^P(\omega) \quad (1);$$

where $S(y; \omega)$ represents a joint score, $\alpha$, $\beta$ and $\gamma$ ($\alpha+\beta+\gamma=1$) are penalty weights, which represent influences of different potential fields on the joint score. $\alpha$ represents the influence of a head potential field on the joint score, $\beta$ represents the influence on an ear potential field on the joint score, and $\gamma$ represents the influence of the pairwise model on the joint score. Because the head is a larger object and has more features, and thus it is easier to detect, so that a probability of error and loss is smaller, and consequently a relatively small weight is given; while the ear is a small object, which is difficult to detect and easy to make a mistake, and thus a larger penalty weight is given. $y_i$ ($i \in v_1$) and $y_j$ ($j \in v_2$) are binary variables, $v_1$ and $v_2$ are candidate variables of head and ear respectively. $\varepsilon$ is a candidate set of pairwise head and ear formed by (i, j), which is also called as an edge set.

Corresponding to feature vector $f_i$ of one head and a feature vector f of one ear, corresponding unitary potential field values can be obtained through formula (2) as follows:

$$\theta_i^U = \varphi^U(f_i, \omega^U), \theta_j^U = \varphi_U(f_j, \omega^U) \quad (2).$$

A joint potential field value corresponding to the pairwise head and ear can be obtained through formula (3) as follows:

$$\theta_{i,j,k_{i,j}}^{P} = \varphi_{k_{i,j}}^{P}(f_i, f_j, \omega^P) \quad (3).$$

where the $\theta_i^U$ represents the unitary potential field value of the head, the $\theta_j^U$ represents the unitary potential field value of the ear, the $\varphi^U$ is used for mapping candidate box features (also referred to as feature vectors) $f_i$ and $f_j$ to the $\theta_i^U$ and the $\theta_j^U$. The $\theta_{i,j,k_{i,j}}^{P}$ represents the joint potential field value of the pairwise head and ear. The $\varphi^P$ is used for mapping the candidate box features of the pairwise head and ear to the $\theta_{i,j,k_{i,j}}^{P}$. A k-th component corresponds to a k-th cluster center index, and $\omega^U$ and $\omega^P$ are trainable parameters.

For each pairwise candidate boxes P of head and ear, an individual score $s_p(\omega)$ defined by a maximum marginal difference of joint score is calculated through formula (4) as follows:

$$s_p(\omega) = \max_{y: y_p=1} S(y;\omega) - \max_{y: y_p=0} S(y;\omega) \quad (4).$$

where $v_1 = v_2$ and $v_1 + v_2 = v$, when a value of v is small, an enumeration method can be used to accurately solve an optimal solution of the formula (4). When the value of v is large, firstly a quadratic pseudo-Boolean function can be used to solve a suboptimal solution of the formula (4) and some data candidates are labeled, then the remaining unlabeled data candidates are solved by using the enumeration method and labeled. After data candidates all are labeled, a function loss of the pairwise model can be calculated. In this design, the quantity of candidate targets is set to 32, and an image scale corresponding to the model is small, which belongs to small-scale target optimization. The solution of the maximum marginal difference of joint score is transformed into the quadratic pseudo-Boolean function optimization problem, the pseudo-Boolean optimization function is an important basic combinatorial optimization problem. A maximum flow minimum cut graph-cut algorithm is used to solve the optimal solution of some variables, and the remaining unlabeled variables are solved by using the enumeration method. This is a heuristic optimization algorithm, which can converge to a better local solution through fast iteration.

The loss function is defined by formula (5) as follows:

$$L(\omega, \hat{y}; X) = \Sigma_{i: \hat{y}_i = 1} v(s_i(\omega, x)) + \Sigma_{i: \hat{y}_i = 0} v(-s_i(\omega, x)) \quad (5)$$

where $v(t) = \log(1 + \exp(-t))$.

2. Training of Pairwise Model

① First, according to scores of the respective images Img obtained through the local model, ranking the obtained scores from high to low and combining a non-maximum suppression method to select 32 numbers of head candidate boxes and 32 numbers of ear candidate boxes, and then forming head and ear pairs based on all the selected head candidate boxes and ear candidate boxes. Afterwards, sorting all the paired head and ear data to form a total of 32*32=1024 candidate pairs each with a layout of head-left and ear-right.

② Then using a k-means algorithm to perform clustering analysis on the candidate pairs, and assigning a class number k to each of samples in the candidate pairs, wherein the class number k refers to a cluster center to which each the image belongs. This cluster center will be used in the next step ③ to calculate the loss value. See the formula (3) for the existence of implicit correlation. The process may be as follows:

calculating k numbers of cluster centers for the 1024 numbers of candidate pairs, i.e., the candidate pairs of the pairwise model of all the samples, k=16; and after applying the k-means method to analyze and cluster all the samples, assigning the class numbers [1, 2, 3 . . . 16] to all the samples. The clustering process may be as follows: letting a rectangular box of head truth value is represented by $[y_1, x_1, y_2, x_2]$ and a rectangular box of ear truth value is represented by $[y_3, x_3, y_4, x_4]$, and thereby forming a layout pair of head-left and ear-right.

$$H_c = (X_{hc}, Y_{hc}) = \left(\frac{x_1 + x_2}{2}, \frac{y_1 + y_2}{2}\right); \quad (6)$$

$$(w_h, h_h) = (x_1 - x_2 + 1, y_2 - y_1 + 1); \quad (7)$$

$$E_c = (X_{ec}, Y_{ec}) = \left(\frac{x_3 + x_4}{2}, \frac{y_3 + y_4}{2}\right); \quad (8)$$

$$(w_e, h_e) = (x_4 - x_3 + 1, y_4 - y_3 + 1). \quad (9)$$

A clustering feature F may be expressed as follows:

$$f_1 = |X_{hc} - X_{ec}|; \quad (10)$$

$$f_2 = |Y_{hc} - Y_{ec}|; \quad (11)$$

$$f_3 = \frac{w_h * h_h}{w_e * h_e}; \quad (12)$$

$$F = (f_1, f_2, f_3). \quad (13)$$

The k-means method is applied to perform clustering analysis through the feature F.

③ Removing the softmax layer of the local model, taking the head feature vector $f_i$ and the ear feature vector $f_j$ obtained by the conv8 as initial features, and sending the initial features into conv10 and conv11 simultaneously. The unitary potential field values are obtained from the conv10, and the pairwise potential field value is obtained from the conv11. For the formula (4), using a maximum flow minimum cut method to determine class labels of all the candidate boxes. If there is a candidate box has not been labeled, using the enumeration method to determine a class label of each remaining candidate box. The formula (5) is applied to calculate a final function loss value. When the loss value is calculated, setting weights of truth labels to be larger than a background weight (setting based on a quantity of the truth labels and a quantity of background labels inversely proportional to the quantity of the truth labels and normalization). In this way, a greater loss will be caused when a class label is wrongly assigned, and the impact on loss will be added to the final loss. Then, calculating a gradient differential of the model, and updating parameters by back propagation, so as to obtain trained model parameters $\omega^U$ and $\omega^P$ under a lowest loss value.

Based on the above design process, a pairwise model 2 of head and ear can be obtained, which is with the layout of head-left and ear-right.

By repeating the above operations of building and training in the step 3, a pairwise model 1 of body and head can be obtained, which is with a layout of body-left and head-right.

Step 4, performing joint detection for an ear by using the local model, the pairwise model 1, the pairwise model 2 and body features.

Figure 4:
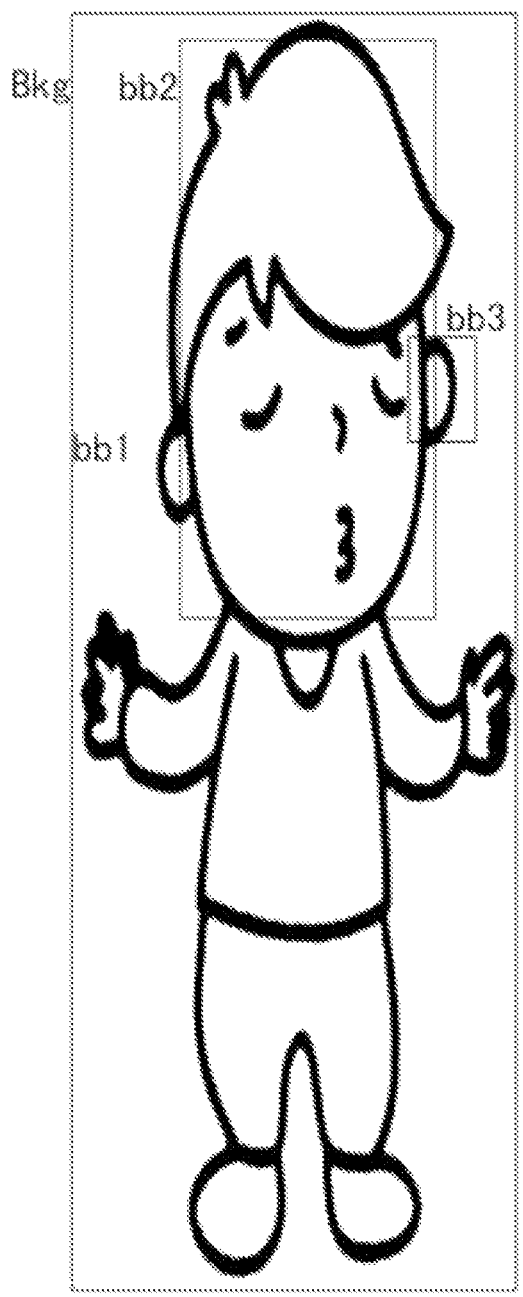
FIG. 4 is a schematic diagram of a model joint detection according to an embodiment of the invention.

Because an ear occupies a relatively small portion of the body, and thus it is a difficult problem to detect the ear in an image with half-body or even full-body as the scene. Referring to FIG. 4, an embodiment of the invention trains the pairwise model 1 (body and head) and the pairwise model 2 (head and ear) as well as the local model for body, head and ear; and the two pairwise models and the one local model are used to jointly judge and detect the ear. As shown in FIG. 4, Bkg represents an image background, bb1 represents a body rectangular box, bb2 represents a head rectangular box, and bb3 represents an ear rectangular box.

(1) Candidate boxes of a detected image are first obtained by using a SSW segmentation method, and the obtained candidate boxes are sent to the local model for detection. Local scores of corresponding classes are obtained and then ranked from high to low. The first 32 numbers of the candidate boxes of each class are selected through a non-maximum suppression method. According to the pairwise model 1 and the pairwise model 2, obtained local features as input items are input into conv10 and conv11, and unitary potential field values and pairwise potential field values of the detected image then are obtained. Finally, calculation is performed based on the unitary potential field values and the pairwise potential field values, to obtain a head candidate set $C_h$ and an ear candidate set $C_e$ as per scores ranking from high to low.

(2) The pairwise model 1 and the local model are used to detect a head location. Because the body is a large object and has rich features, and thus the local model is easy to detect the location of the body. Then, through the location information of the body, combined with head candidate box probabilities obtained from the local model to judge that: for head candidate boxes intersecting with an upper region of the body, ones of which with high probabilities are selected as a head candidate set. According to the theory of human body structure proportion, a shoulder width is a distance about 1.5~2.3 times a height of the head. According to a width of the body candidate box, a head height $H_h$ can be calculated. Taking a top center of the body candidate box as a reference, moving upwards and downwards each with a distance of one head height, and moving leftwards and rightwards each with a distance of one head height to thereby form a reference region $H_s=4H_h^2$. Candidate boxes intersecting with the region $H_s$ are taken as a head candidate box set $H_c$. A head probability threshold $a_h$ is set, and candidate boxes meeting the condition of $H_c>a_h$ are used as head candidate targets $H_{ca}$.

(3) $C_h$ number of head candidate targets are selected as per scores $S_h$ of the pairwise model 1 of body and head ranking from high to low. Joint judgement is then performed on $H_{ca}$ and the $C_h$ number of head candidate targets to obtain an intersection of them. When the intersection is not null/empty, head candidate boxes of the intersection are used as a head candidate target set $H_{sec}$, or when intersection is empty, the head candidate targets with higher scores in $H_{ca}$ are selected as the head candidate target set $H_{sec}$.

(4) According to the head candidate target set $H_{sec}$ obtained in the above step, ear candidate targets corresponding to head candidate boxes in the set $H_{sec}$ are calculated. According to the method of "facial height being divided into approximately three equal parts and facial width being divided into approximately five equal parts", the location of ear is roughly between the upper ⅓ part and the lower ⅓ part based on a center line of the head height as reference; and if it is a child, moving the center line down to the lower ⅓ part of the head height. Left and right positions of the ear are about at leftwards ⅕ part and rightwards ⅕ part relative to the head width. Considering that the head's outward tilt posture generally does not exceed 45 degrees, the method extends the left and right positions of the ear each with one ⅕ part outwards (in order to cover special cases, it can be extended outwards with three ⅕ parts), so as to measure a left-right distance range of the ear. Therefore, an embodiment of the invention sets an ear candidate region to be in a range of $[-\frac{2}{5}H_h, \frac{2}{5}H_h]$ obtained according to a range of $[-\frac{2}{5}, \frac{2}{5}]$ of head width using left and right boundary lines as reference and being replaced the head width with the head height $H_h$. According to head regions in the set $H_{sec}$, corresponding ear regions can be calculated as $$\left[-\frac{2}{5}H_h, \frac{2}{5}H_h\right].$$

Intersection of a segmentation target set and the ear regions $$\left[-\frac{2}{5}H_h, \frac{2}{5}H_h\right]$$

is taken as an ear candidate set $S_e$. All the candidate boxes in the set $S_e$ are ranked as per scores of the local model for ear from high to low to obtain an ear candidate target set $S_{ec}$. Then, the pairwise model 2 is applied to obtain a candidate box score set, and then an intersection of $C_e$ number of ear candidate boxes contained in the candidate box score set and ear-containing candidate boxes in the head candidate target set $H_{sec}$, if the intersection is not null, the intersection is taken as an ear detection target set $C_{ec}$, and whereas, if the intersection is null, ear candidate boxes with higher scores in the set $C_e$ are selected as the ear detection target set $C_{ec}$.

(5) A joint judgement is performed on the set $C_{ec}$ and the set $S_{ec}$ to obtain an intersection of the ear detection target set $C_{ec}$ and the set $S_{ec}$; when the intersection is not empty, taking the ear candidate box with the largest score obtained by the pairwise model 2 in the intersection as a resultant ear object; or when the intersection is empty, selecting the ear candidate box with the largest score in the set $C_{ec}$ as the resultant ear object.

(6), performing curve evolution of ear outer contour. In particular, the rectangular candidate box of the ear (i.e., the ear candidate box corresponding to the resultant ear object) is taken as an initial boundary, and the curve evolution is performed on an image in a region twice as large as that the ear candidate box corresponding to the resultant ear object through a Chan-Vese (C-V) method, thereby a curve contour of the ear is obtained. An ear contour pixel coordinate set is set to that $P_c$ $\{P_{i,j}|i,j \in N\}$. Coordinates (i, j) of uppermost, lowermost, leftmost and rightmost pixels in the contour curve of the ear are extracted, and a rectangular box is then redrawn according to the extracted coordinates as a resultant ear object region.

What is claimed is:

1. An ear detection method with deep learning pairwise model based on contextual information, comprising:
  step 1, image preprocessing and object labeling, comprising:
    obtaining original images, performing data augmentation processing on the original images to obtain an image training set, and labeling bodies, heads and ears of images in the image training set with classes through rectangular boxes;
  step 2, modifying an Oquab network to be a local model for four classes through transfer learning and training the local model, comprising:
    i) removing an output layer and a last feature layer of the Oquab network, adding a fully connected layer including rectified linear unit (ReLU) and dropout functions for feature extraction, and adding an output layer including the four classes of body, head, ear and background;

ii) generating suggested candidate boxes for each the image in the image training set through a signed sliding window (SSW) method, and adding truth values of the body, the head and the ear into the suggested candidate boxes for each the image to form training samples;

iii) reading images of the training samples, calculating an image average value according to the training samples, subtracting the image average value from the training samples and then training; wherein the image average value is represented by [$M_r$, $M_g$, $M_b$], and $M_r$ represents a red average value of the training samples, $M_g$ represents a green average value of the training samples, and $M_b$ represents a blue average value of the training samples; and iv) employing an already set network structure, and training network parameters of the local model through a random gradient descent method with momentum;

step 3, training two pairwise models of head and ear as well as body and head based on the local model individually, comprising: selecting a first convolutional layer (conv1) through an eighth convolutional layer (conv8) of the local model as a front part of each the pairwise model and connecting two fully connected layers (conv10, conv 11) In parallel as a rear part of each the pairwise model, wherein 1) pairwise model building, comprising:

for one of the pairwise models, the front part thereof is the same as that of the trained local model, and the rear part thereof is the two fully connected layers connected in parallel; one of the two fully connected layers is a unitary potential field network model layer, and the other of the two fully connected layers is a pairwise model potential field network layer; and a joint score function is expressed as formula (1):

$$S(y;\omega)=\alpha\Sigma_{i\in v_1}y_i\theta_i^U(\omega)+\beta\Sigma_{j\in v_2}y_j\theta_j^U(\omega)+\gamma\Sigma_{(i,j)\in\varepsilon}y_iy_j\theta_{i,j,k_{i,j}}^P(\omega) \quad (1)$$

where $S(y;\omega)$ represents a joint score; $\alpha$, $\beta$ and $\gamma$ are penalty weights, which represent influences of different potential fields on the joint score; $\alpha$ represents the influence of a head potential field on the joint score, $\beta$ represents the influence of an ear potential field on the joint score, $\gamma$ represents the influence of the pairwise model on the joint score, and $\alpha+\beta+\gamma=1$; $y_i$ and $y_j$ are binary variables, $v_1$ and $v_2$ are candidate variables of head and ear respectively; and $\varepsilon$ is a candidate set of pairwise head and ear formed by (i, j), namely, an edge set;

corresponding to a feature vector $f_i$ of single head and a feature vector $f_j$ of single ear, corresponding unitary potential field values are obtained through formula (2):

$$\theta_i^U=\varphi^U(f_i,\omega^U), \theta_j^U=\varphi_U(f_j,\omega^U) \quad (2)$$

a joint potential field value corresponding to the head and the ear in pair is obtained through formula 3:

$$\theta_{i,j,k_{i,j}}^P=\varphi_{k_{i,j}}^P(f_i,f_j,\omega^P) \quad (3)$$

where $\theta_i^U$ represents the unitary potential field value of the head, $\theta_j^U$ represents the unitary potential field value of the ear, $\varphi^U$ maps the feature vectors $f_i$ and $f_j$ to $\theta_i^U$ and $\theta_j^U$, or $\theta_{i,j,k_{i,j}}^P$ represents the joint potential field value of the head and the ear in pair, $\varphi^P$ maps candidate features of the head and the ear in pair to $\theta_{i,j,k_{i,j}}^P$, a k-th component corresponds to a k-th cluster center index, and $\omega^U$ and $\omega^P$ are trainable parameters;

for each pairwise candidate boxes P of head and ear, an individual score $s_p(\omega)$ defined by a maximum marginal difference of joint score is obtained through formula (4):

$$s_p(\omega)=\max_{y:y_p=1}S(y;\omega)-\max_{y:y_p=0}S(y;\omega) \quad (4)$$

where $v_1=v_2$ and $v_1+v_2=v$; when a value of v is small, an enumeration method is used to solve an optimal solution of the formula (4); when the value of v is large, a quadratic pseudo-Boolean function is first used to solve a suboptimal solution of the formula (4) and some of data are labeled, and then remaining unlabeled data are solved through the enumeration method and labeled; and after data all are labeled, a function loss of the pairwise model is calculated through a loss function expressed as formula (5):

$$L(\omega,\hat{y},X)=\Sigma_{i:\hat{y}_i=1}v(s_i(\omega,x))+\Sigma_{i:\hat{y}_i=0}v(-s_i(\omega,x)) \quad (5)$$

where $v(t)=\log(1+\exp(-t))$;

2) Pairwise model training, comprising:

① according to scores of images obtained through the local model, selecting head candidate boxes and ear candidate boxes by ranking the scores from high to low and using a non-maximum suppression method, forming head and ear pairs based on the selected head candidate boxes and ear candidate boxes, and sorting paired head and ear data to form candidate pairs each with a layout of head-left and ear-right;

② performing cluster analysis on the candidate pairs through a k-means method, and assigning a class number k to each of samples in the candidate pairs, wherein the class number k refers to a cluster center to which each the sample belongs;

③ removing a softmax layer of the local model, taking the feature vector $f_i$ of head and the feature vector $f_j$ of ear obtained by the eighth convolution layer (conv8) as initial features, sending the initial features simultaneously to the two fully connected layers (conv10, conv11) to thereby obtain the unitary potential field values from the unitary potential field network model layer and the joint potential field value from the pairwise model potential field network layer; determining class labels of candidate boxes by using a maximum flow minimum cut method for the formula (4), using the enumeration method to determine a class label of each remaining candidate box when there is a candidate box has not been labeled, calculating a final function loss value through the formula (5), obtaining trained values of the trainable parameters $\omega^U$, $\omega^P$ under a lowest loss value by calculating a gradient differential of the pairwise model and updating parameters through back propagation, and thereby obtaining the pairwise model of head and ear with the layout of head-left and ear-right; and repeating the above 1) and 2) in the step 3, and thereby obtaining the pairwise model of body and head with a layout of body-left and head-right;

step 4, performing joint detection for an ear through the local model, the two pairwise models and body features;

I) obtaining candidate boxes of a detected image through the SSW segmentation method, and sending the candidate boxes of the detected image to the local model for detection to obtain local scores of corresponding classes of the candidate boxes of the detected image, ranking the local scores from high to low, and selecting candidate boxes from the candidate boxes of the detected image for the corresponding classes through a non-maximum suppression method; inputting local features corresponding to the selected candidate boxes to the two fully connected layers to obtain unitary potential field values and pairwise potential field values of the detected image according to the two pairwise models; calculating based on the unitary potential field values and the pairwise potential field values, to obtain a head candidate set and an ear candidate set as per scores ranking from high to low;

II) detecting a head location based on through the pairwise model of body and head and the local model, comprising:

calculating a head height $H_h$ according to a width of a body candidate box; moving upwards, downwards, leftwards and rightwards each with a distance of one the head height $H_h$ to form a reference region $H_s = 4H_h^2$ by taking a top center of the target candidate box as a reference, obtaining candidate boxes in the head candidate set intersecting with the reference region $H_s$ as a head candidate box set $H_c$, setting a head probability threshold $a_h$, and obtaining candidate boxes in the head candidate box set $H_c$ meeting a condition of $H_c > a_h$ as head candidate targets $H_{ca}$;

III) selecting $C_h$ number of head candidate targets as per scores $S_h$ of the pairwise model of body and head ranking from high to low, performing joint judgement on the head candidate targets $H_{ca}$ and the $C_h$ number of head candidate targets to obtain a first intersection of the head candidate targets $H_{ca}$ and the $C_h$ number of head candidate targets; taking the first intersection as a head candidate target set $H_{sec}$ when the first intersection is not empty, or selecting the head candidate targets with larger scores from the $C_h$ number of head candidate targets as the head candidate target set $H_{sec}$ when the first intersection is empty;

IV) calculating ear candidate targets corresponding to head candidate boxes in the head candidate target set $H_{sec}$ based on the head candidate target set $H_{sec}$, comprising:

setting an ear candidate region in a range of $$\left[-\frac{2}{5}H_h, \frac{2}{5}H_h\right]$$

obtained according to a range of $$\left[-\frac{2}{5}, \frac{2}{5}\right]$$

of head width using left and right boundary lines as reference and being replaced the head width with the head height $H_h$, calculating corresponding ear regions $$\left[-\frac{2}{5}H_h, \frac{2}{5}H_h\right]$$

according to head regions in the head candidate target set $H_{sec}$, obtaining an intersection of a segmentation target set and the ear regions $$\left[-\frac{2}{5}H_h, \frac{2}{5}H_h\right]$$

as an ear candidate set $S_e$, obtaining an ear candidate target set $S_{ec}$ by ranking candidate boxes in the ear candidate set $S_e$ as per scores of the local model for ear from high to low; obtaining a candidate box score set by applying the pairwise model of head and ear, obtaining a second intersection of $C_e$ number of ear candidate boxes contained in the candidate box score set and ear-containing candidate boxes in the head candidate target set $H_{sec}$; taking the second intersection as an ear detection target set $C_{ec}$ when the second intersection is not empty, or selecting ear candidate boxes with larger scores from the $C_e$ number of ear candidate boxes as the ear detection target set $C_{ec}$ when the second intersection is empty;

V) performing joint judgement on the ear detection target set $C_{ec}$ and the ear candidate target set $S_{ec}$, obtaining a third intersection of the ear detection target set $C_{ec}$ and the ear candidate target set $S_{ec}$, taking an ear candidate box with a largest score of the pairwise model of head and ear in the third intersection as a resultant ear object when the third intersection is not empty, or selecting the ear candidate box with a largest score from the ear detection target set $C_{ec}$ as the resultant ear object when the third intersection set is empty; and VI) performing curve evolution of ear outer contour, comprising:

obtaining a curve contour of the ear by taking the ear candidate box corresponding to the resultant ear object as an initial boundary and performing the curve evolution on an image in a region twice as large as that the ear candidate box corresponding to the resultant ear object through a Chan-Vese (C-V) method; extracting coordinates of uppermost, lowermost, leftmost and rightmost pixels in the curve contour of the ear from an ear contour pixel coordinate set $P_c = \{P_{r,c} | r, c \in N\}$; and redrawing a rectangular box based on the coordinates of the uppermost, lowermost, leftmost and rightmost pixels as a resultant ear object region.

2. The ear detection method with deep learning pairwise model based on contextual information according to claim 1, wherein weights of truth labels and a background weight are set based on a quantity of the truth labels and a quantity of background labels inversely proportional to the quantity of the truth labels and normalized, when using the formula (5) to calculate the final function loss value.

* * * * *